3,148,073
OPHTHALMIC GLASSES FOR USE IN WELDERS' GOGGLES
John J. Smith, Natrona Heights, and William J. Englert, New Kensington, Pa., assignors to Pittsburgh Plate Glass Company, Pittsburgh, Pa., a corporation of Pennsylvania
No Drawing. Filed May 8, 1961, Ser. No. 108,291
8 Claims. (Cl. 106—52)

This invention relates to an ophthalmic glass and it has particular relation to a glass which has transmittance properties rendering it useful as a protective lens in goggles used by welders. Eye protective ophthalmic glasses which are used in welders goggles should absorb practically all of the ultraviolet and infrared portions of the spectrum.

It is desired that glasses of this type have a composition such that they can be made in quantity in a continuous operation in a glass tank and pressed into lens blanks in an automatic lens blank pressing operation. Glasses having similar transmittance properties have contained appreciable quantities of lead oxide and relatively low amounts of silica. These glasses are objectionable because they do not have a high enough working range when compared with the liquidus temperature. When the glasses are worked at temperatures suitable for ophthalmic pressing, they tend to devitrify because of the proximity of the liquidus temperature to the working range. For example, the lead-containing glasses have a working range of 1150 to 1600° F., whereas the liquidus temperature is about 1600° F. The working range is the temperature range within which the viscosity in poises is $10^4$ to $10^{7.6}$.

It is an object of the present invention to provide a glass having substantially complete absorption of the ultraviolet and near infrared portions of the spectrum. It is another object of the invention to produce such a glass which attenuates or eliminates the transmittance of the sodium line (589 millimicrons). By removing the sodium glow surrounding welding or cutting operations, this glass will permit the operator to view his work more clearly. It is a further object of the invention to produce such a glass having a working range sufficiently higher than its liquidus temperature so that it can be continuously melted, refined, formed into gobs and pressed into ophthalmic lens blanks.

In accordance with the invention, these and other objects are achieved by the manufacture of glasses having the following compositions in percent by weight: 63 to 70 percent $SiO_2$, 6 to 12 percent $Na_2O$, 6 to 12 percent $K_2O$, 10 to 15 percent ZnO, 1.5 to 4 percent $TiO_2$, 2.5 to 4.5 percent CuO and 0.0025 to 0.045 percent CoO. Small amounts, for example 0.1 to 2 percent by weight of refining agents such as $As_2O_5$ or $Sb_2O_5$ may also be present. Such a glass is blue-green in color. The ratio of CuO to CoO in the glass must be substantial, for example, approximately 100:1 to 1000:1 in parts by weight to obtain the desired absorption and transmission. The sum of the alkali metal oxides, $Na_2O$ and $K_2O$ is about 15.5 to 20 percent. A small amount of $Li_2O$ may be used in lieu of $Na_2O$ and $K_2O$.

Some examples of the glasses of the present invention and their properties are given below in Table I wherein the percentages are by weight:

Table I

| Ingredients and properties | Compositions | | | | | |
|---|---|---|---|---|---|---|
| | 1 | 2 | 3 | 4 | 5 | 6 |
| $SiO_2$ | 66.55 | 67.02 | 66.96 | 66.02 | 64.03 | 63.11 |
| $Na_2O$ | 7.87 | 7.92 | 7.91 | 7.80 | 7.49 | 8.14 |
| $K_2O$ | 7.97 | 8.02 | 8.01 | 7.90 | 9.00 | 9.01 |
| ZnO | 11.39 | 11.47 | 11.46 | 11.30 | 13.98 | 14.95 |
| $TiO_2$ | 2.21 | 2.22 | 2.22 | 2.19 | 2.22 | 1.52 |
| $As_2O_5$ ($Sb_2O_5$ in compositions 5 and 6) | 0.55 | 0.56 | 0.56 | 0.55 | 0.50 | 0.50 |
| CuO | 3.43 | 2.77 | 2.87 | 4.22 | 2.77 | 2.77 |
| CoO | 0.0276 | 0.0112 | 0.0404 | 0.0153 | 0.0112 | 0.0112 |
| Strain Point, ° F | 880 | 885 | 870 | 860 | 905 | 890 |
| Annealing Range, ° F | 955–845 | 965–865 | 950–840 | 935–825 | 980–875 | 965–855 |
| Softening Point, ° F | 1,304 | 1,321 | 1,303 | 1,286 | 1,329 | 1,306 |
| Liquidus Temperature, ° F | Below 1,350 | Below 1,300 | Below 1,265 | Below 1,300 | Below 1,200 | Below 1,300 |
| Working Range, ° F | 1,304–1,890 | 1,321–1,905 | 1,303–1,890 | 1,286–1,870 | 1,329–1,917 | 1,306–1,910 |
| Color | Blue-green | Blue-green | Blue-green | Blue-green | Blue-green | Blue-green |

The strain point is that temperature at which the internal stress in a glass is substantially relieved in about 4 hours as tested by the method designated as ASTM–C 338–54T. The annealing point is that temperature at which the internal stress in a glass is substantially relieved in 15 minutes as tested by the method designated as ASTM–C 338–54T. The annealing range is the range of temperatures between the annealing point and the strain point. The softening point is the temperature at which a glass rod elongates at a given rate according to ASTM–C 338–57 test method. The liquidus temperature is the maximum temperature at which equilibrium exists between the molten glass and its primary crystalline phase.

The amounts of the various components of the glass may vary. $SiO_2$ is employed as the principal glass former. If an amount greater than 70 percent by weight of $SiO_2$ is used, the glass is difficult to melt, whereas, if less than about 63 percent by weight of $SiO_2$ is present, the durability of the glass is poor. The amount of alkali metal oxides, $Na_2O$, $K_2O$ and $Li_2O$, is maintained between 15.5 and 20 percent by weight to aid in the melting of the glass. At least 15.5 percent alkali metal oxides is required to provide the glass with a low liquidus temperature. The ZnO and $TiO_2$ in combination with the other ingredients in the glass provide the glass with a working range and liquidus temperature which permit the glass to be worked and pressed into ophthalmic lens blanks without devitrification of the glass during the gobbing and pressing operation.

The copper oxide and cobalt oxide contents of the glass in combination with the other ingredients provide it with the proper absorption and transmission characteristics. A relatively large amount of copper oxide as compared to cobalt oxide must be used in order to obtain these properties in the glass.

The transmittance properties of the glasses of Table I are given below in Table II to illustrate the type of glass contemplated by the present invention:

*Table II*

| Transmittance properties | Compositions | | | | | |
|---|---|---|---|---|---|---|
| | 1 | 2 | 3 | 4 | 5 | 6 |
| Glass thickness in millimeters | 2.97 | 2.97 | 3.00 | 2.95 | 2.96 | 2.95 |
| Luminous transmittance for Illuminant "C" (percent) | 6.6 | 15.2 | 17.6 | 4.5 | 19.5 | 19.5 |
| Total Solar ultraviolet transmittance (percent) | 0.0 | 0.6 | 0.9 | 0.0 | 0.2 | 0.6 |
| Total Solar infrared transmittance (percent) | 4.3 | 6.6 | 5.9 | 3.6 | 12.0 | 11.5 |
| Total Solar Energy transmittance (percent) | 5.3 | 9.7 | 4.7 | 3.9 | 12.5 | 12.6 |
| Dominant Wavelength (millimicrons) | 485.2 | 486.2 | 487.7 | 489.0 | 492.4 | 489.5 |
| Excitation Purity (percent) | 70.7 | 58.1 | 56.0 | 64.0 | 37.0 | 45.2 |
| Transmittance at millimicrons (percent): | | | | | | |
| 350 | 0.0 | 0.0 | 0.0 | 0.0 | 0.0 | 0.0 |
| 390 | 0.2 | 2.1 | 2.9 | 0.0 | 0.7 | 2.2 |
| 400 | 1.7 | 6.6 | 6.5 | 0.2 | 2.7 | 5.5 |
| 440 | 11.6 | 24.2 | 24.8 | 4.6 | 18.4 | 23.1 |
| 480 | 20.8 | 36.7 | 39.4 | 12.3 | 33.8 | 36.7 |
| 520 | 13.5 | 28.7 | 34.0 | 10.3 | 32.3 | 32.9 |
| 560 | 4.5 | 12.8 | 14.5 | 2.7 | 20.0 | 19.3 |
| 600 | 0.1 | 2.1 | 2.6 | 0.1 | 5.6 | 5.0 |
| 640 | 0.0 | 0.3 | 0.2 | 0.1 | 1.4 | 1.1 |
| 680 | 0.0 | 0.3 | 0.0 | 0.1 | 0.2 | 0.2 |
| 720 | 0.0 | 0.3 | 0.0 | 0.1 | 0.0 | 0.0 |
| 750 | 0.0 | 0.3 | 0.0 | 0.1 | 0.0 | 0.0 |
| 1,100 | 0.0 | 0.0 | 0.6 | 0.0 | 6.4 | 4.0 |

As used in the table, Illuminant "C" is an illuminant developed by the International Commission on Illumination and is described in Hardy's Handbook of Colorimetry published by The Technology Press of Massachusetts Institute of Technology in 1936. When the C.I.E. system of color description is used as described in the handbook, the glasses of the invention have an excitation purity between 35 to 75 percent and a dominant wave length between 483 and 493 millimicrons for a thickness of about three millimeters.

The glasses of the invention can be produced from conventional glass making ingredients such as sand, soda ash, potassium carbonate, zinc oxide, titanium dioxide, arsenious oxide, antimony oxide, copper oxide and cobalt oxide. The glass is especially designed for melting and refining in a continuous, ophthalmic tank. The glass can also be made in refractory pots. Various size pots can be employed and the melting temperatures and times will vary according to the amount of glass being formed in the pot. The glass is formed under oxidizing conditions.

Mixtures of the conventional glass making ingredients that can be used to make the six glasses of Table II are presented below in Table III.

*Table III*

| Glass Making Ingredients | Compositions | | | | | |
|---|---|---|---|---|---|---|
| | 1 | 2 | 3 | 4 | 5 | 6 |
| Sand, pounds | 964 | 964 | 964 | 964 | 930 | 916 |
| Soda Ash, pounds | 165 | 165 | 165 | 165 | 156 | 172 |
| Potassium Carbonate, pounds | 173 | 173 | 173 | 173 | 196 | 196 |
| Sodium Nitrate, pounds | 50 | 50 | 50 | 50 | 50 | 50 |
| Zinc Oxide, pounds | 165 | 165 | 165 | 165 | 203 | 217 |
| Titanium Dioxide, pounds | 32 | 32 | 32 | 32 | 32.2 | 22 |
| Arsenious Oxide, pounds | 8 | 8 | 8 | 8 | | |
| Antimony Oxide, pounds | | | | | 7.25 | 7.25 |
| Copper Oxide, pounds | 50 | 40 | 41.5 | 62 | 40.17 | 40.17 |
| Cobalt Oxide, pounds | 0.4000 | 0.1600 | 0.0604 | 0.2228 | 0.1625 | 0.1625 |

The procedures and conditions hereinafter described may be employed to produce from 8 to 10 pounds of the glass in a refractory pot. The empty pot is preheated in a furnace at a temperature of 2300° F. A portion of the thoroughly mixed batch is ladled into the preheated pot and the temperature of the furnace is gradually increased. The remaining portion of the mixed batch is ladled into the pot over a period of one hour, and the furnace temperature is increased to 2650° F. to melt substantially all of the glass making materials. The furnace temperature is maintained at about 2650° F. for an additional two hours to permit refining of the glass. During this time, the chemical reactions are completed and the glass frees itself of bubbles and is homogenized.

After the glass is refined, the temperature of the furnace is reduced slowly over a one-hour period to 2300° F. The pot is removed from the furnace and the glass is cast on a preheated metal table and rolled with a heavy metal roller into the form of a plate. The plate is placed in a kiln and annealed from about 1050° F. to about 825° F. at a rate of about 3° F. per minute. Thereafter, it is cooled more rapidly to room temperature.

The batch production of the glass in a refractory pot has been described in order to provide more precise data for the manufacture of the glass. When the glasses are made in a continuous, ophthalmic tank, the mixed batch ingredients are continuously fed into the melting portion of the tank. The batch is melted and formed into glass by the controlled combustion of natural gas. The glass then passes to a refining section where it is homogenized. The refined glass then issues in a stream from an orifice and is cut into gobs by conventional glass-gobbing equipment. The gobs are received in a mold and are pressed into lens blanks in accordance with conventional lens blank pressing techniques. The lens blanks are annealed and cooled to room temperature. Thereafter they are ground and polished to the proper thickness and curvature to serve as ophthalmic lenses.

Although the present invention has been described with respect to specific details of certain embodiments thereof, it is not intended that such details act as limitations upon the scope of the invention except insofar as included in the accompanying claims.

This application is a continuation-in-part of our copending patent application Serial No. 862,023, filed on December 28, 1959, now abandoned.

We claim:

1. An infrared and ultraviolet absorbing glass, which at about a 3 millimeter thickness transmits less than about 1 percent of the total solar ultraviolet energy and less than about 12 percent of the solar infrared energy and has a transmittance of less than about 5.6 percent at a wavelength of 600 millimicrons and less than about 0.3 percent at a wavelength of 750 millimicrons, consisting essentially of the following ingredients in percent by weight: 63 to 70 percent $SiO_2$, 15.5 to 20 percent alkali metal oxides, 10 to 15 percent ZnO, 1.5 to 4 percent $TiO_2$, 2.5 to 4.5 percent CuO and 0.0025 to 0.045 percent CoO, the ratio of CuO to CoO being between 1000:1 and 100:1.

2. A glass as described in claim 1 wherein the alkali metal oxides comprise 6 to 12 percent $Na_2O$ and 6 to 12 percent $K_2O$.

3. A glass as described in claim 1 containing 0.1 to 2 percent of a refining agent selected from the group consisting of $As_2O_5$ and $Sb_2O_5$ and combinations thereof.

4. A glass having the following approximate calculated composition in percent by weight: 66.55 percent $SiO_2$, 7.87 percent $Na_2O$, 7.97 percent $K_2O$, 11.39 percent ZnO, 2.21 percent $TiO_2$, 0.55 percent $As_2O_5$, 3.43 percent CuO and 0.0276 percent CoO.

5. A glass having the following approximate calculated composition in percent by weight: 67.02 percent $SiO_2$, 7.92 percent $Na_2O$, 8.02 percent $K_2O$, 11.47 percent ZnO, 2.22 percent $TiO_2$, 0.56 percent $As_2O_5$, 2.77 percent CuO and 0.0112 percent CoO.

6. A glass having the following approximate calculated composition in percent by weight: 66.02 percent $SiO_2$, 7.80 percent $Na_2O$, 7.90 percent $K_2O$, 11.30 percent ZnO, 2.19 percent $TiO_2$, 0.55 percent $As_2O_5$, 4.22 percent CuO and 0.0153 percent CoO.

7. A glass having the following approximate calculated composition in percent by weight: 64.03 percent $SiO_2$, 7.49 percent $Na_2O$, 9.00 percent $K_2O$, 13.98 percent ZnO, 2.22 percent TiO, 0.50 percent $Sb_2O_5$, 2.77 percent CuO and 0.0112 percent CoO.

8. A glass having the following approximate calculated composition in percent by weight: 63.11 percent $SiO_2$, 8.14 percent $Na_2O$, 9.01 percent $K_2O$, 14.95 percent ZnO, 1.52 percent $TiO_2$, 0.50 percent $Sb_2O_5$, 2.77 percent CuO and 0.0112 percent CoO.

References Cited in the file of this patent

UNITED STATES PATENTS

| | | |
|---|---|---|
| 1,331,937 | Luckiesh et al. | Feb. 24, 1920 |
| 2,676,109 | Barnes et al. | Apr. 20, 1954 |
| 2,693,422 | Duncan et al. | Nov. 2, 1954 |
| 2,854,349 | Dreyfus et al. | Sept. 30, 1958 |
| 2,912,339 | Middleswarth et al. | Nov. 10, 1959 |

OTHER REFERENCES

Weyl: "Coloured Glasses," published 1959 by Dawson's of Pall Mall, London (pages 166–167, 190–193).

Ordnance Dept. Document No. 2037, "The Manufacture of Optical Glass and of Optical Systems," May 1921, G.P.O., Wash., D.C. (page 70).